July 6, 1937.  G. A. TAFF  2,086,396
BUMPER DEVICE
Filed Aug. 20, 1936
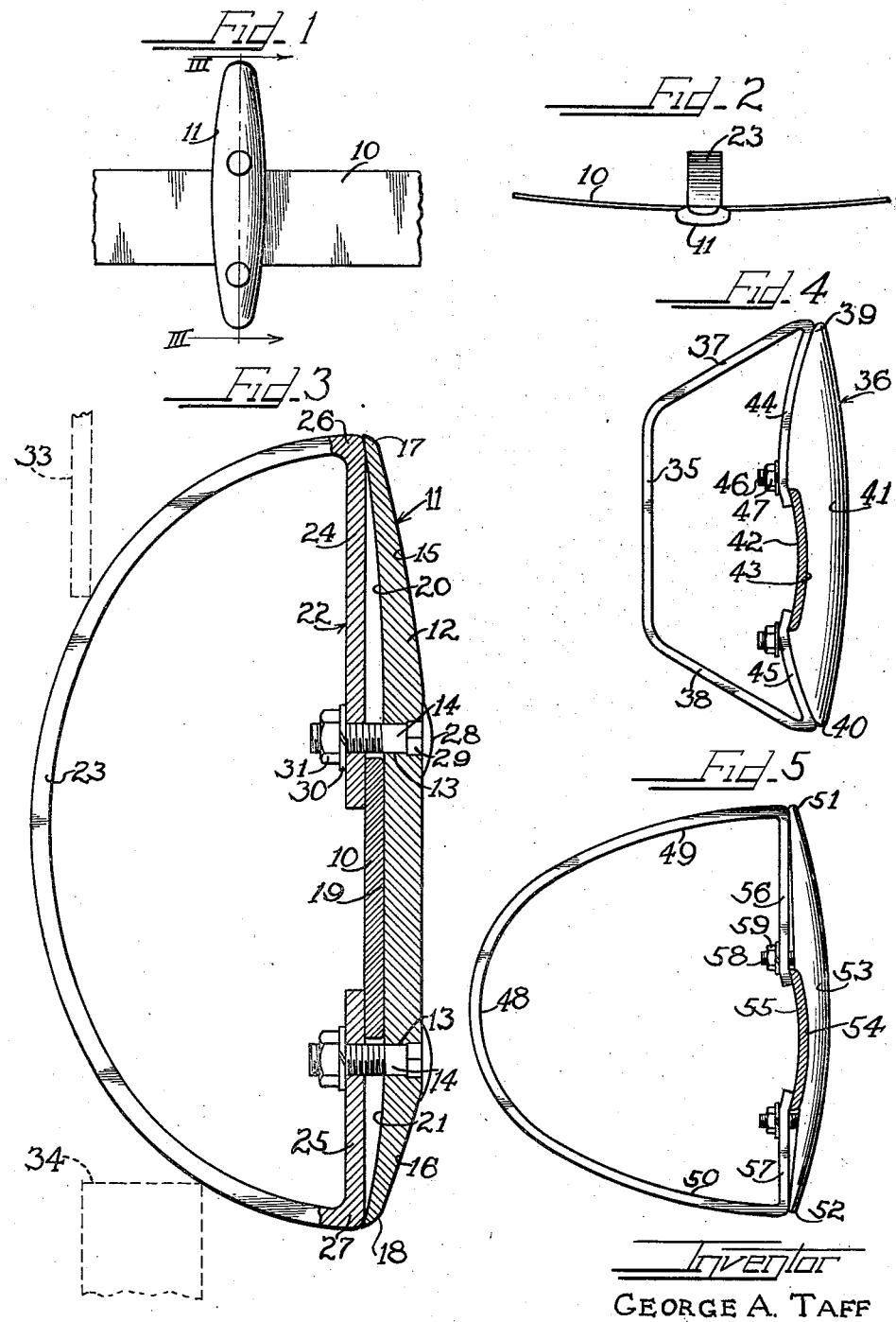
Inventor
GEORGE A. TAFF Patented July 6, 1937

2,086,396

UNITED STATES PATENT OFFICE 2,086,396

BUMPER DEVICE

George A. Taff, Colorado Springs, Colo.

Application August 20, 1936, Serial No. 96,987

10 Claims. (Cl. 293—55)

This invention relates to a bumper device and more particularly to a bumper guard for attachment in vertical position to the bumper or buffer of a vehicle, such as an automobile, truck or the like.

The interengagement of the bumpers of colliding automobiles is not at all uncommon notwithstanding the rather prevalent use of bumper guards to insure against such interlocking of bumpers. Furthermore, when two bumpers do become interlocked, the task of separating them is oftentimes rendered more difficult because of the shape and design of the bumper guards. The types of bumper guards more generally in use are provided with rather pointed extremities that are hard to extricate from another bumper with which they may become entangled. Quite often it is necessary to jump upon, or otherwise apply considerable weight, to one of the interlocked bumpers in order to depress the same and permit the other bumper to rise over the depressed bumper and thus free the two.

In accordance with the principles of the present invention, my bumper guards are so constructed as to facilitate the freeing of interlocked bumpers by causing one bumper to ride up over the other. This is accomplished by providing a rearwardly extending bowed portion that presents gently sloping surfaces leading to and protecting the extremities of the front fender member of the guard. Thus, when a bumper or other object comes into contact with such sloping surfaces, there is a tendency, during the attempt to separate from such other bumper or object, for the bumper or object to ride along these sloping surfaces and pass clear of the extremities of the front fender member. The sloping surfaces act as cams to free interlocking bumpers from each other or to free a bumper from a curb over which it may have run.

It is therefore an important object of this invention to provide an improved construction of bumper guard wherein a rear portion thereof is provided with gradually sloping surfaces tending to cause objects in contact therewith to ride thereover free of the extremities of the front fender member of the guard.

It is a further important object of this invention to provide a bumper guard adapted to be clampingly held upon a bumper member by securing means that do not pass through the bumper member and therefore do not weaken the same.

It is a further important object of this invention to provide a bumper guard wherein a front fender member and a rear member are adapted to be clampingly held upon a horizontal bumper member in vertical position, and the rear member is provided with a bowed portion presenting gradually sloping surfaces extending to the extremities of the front fender member to protect the same and to facilitate disengagement of the bumper with another bumper or the like.

Other and further important objects of this invention will be apparent from the disclosures in the specification and the accompanying drawing.

This invention (in a preferred form) is illustrated in the drawing and hereinafter more fully described.

On the drawing:

Figure 1 is a fragmentary front elevational view of a bumper provided with a bumper guard embodying the principles of this invention.

Figure 2 is a top plan fragmentary view of the same.

Figure 3 is an enlarged sectional view taken substantially on the line III—III of Fig. 1, partly in elevation.

Figure 4 is a side elevational view of a modified form of bumper guard, showing the bumper proper in cross section.

Figure 5 is a side elevational view of a further modification of my invention, with the bumper proper shown in section.

As shown on the drawing:

The reference numeral 10 indicates a horizontal bumper bar, buffer or the like, such as is commonly used on automotive vehicles to protect the front and rear thereof against collision. A bumper guard 11, embodying the principles of my invention, is adapted to be mounted in vertical position upon the bumper or buffer 10, two such bumper guards being usually mounted upon each bumper 10 in spaced relation.

The bumper guard 11 of the preferred construction shown in Figs. 1 to 3 inclusive, comprises a front fender portion 12 having a pair of spaced apertures 13 for receiving bolts 14 or other suitable securing means. The fender member 12, which will generally be formed of steel, has a front face that is rounded toward the edges and that tapers rearwardly, as at 15 and 16, toward the upper and lower extremities, 17 and 18, respectively. The rear face of the fender member 12 has an intermediate portion 19 that conforms to the face of the bumper 10 and has end portions 20 and 21 that slope slightly backwardly toward the extremities 17 and 18, respectively. The extremities 17 and 18 are thus somewhat pointed in cross section, although they may be rounded along their edges to present a pleasing appearance.

A rear member 22 is adapted to be secured to said front member 12 by means of the bolts 14 when mounted upon the bumper 10. Said rear member 22 may suitably be formed from a steel strip with a rearwardly bowed or arcuate portion 23 having inturned legs 24 and 25 extending toward each other in the same plane from the ends 26 and 27, respectively, of said arcuate portion 23. In assembled relation, the ends 26 and 27 are substantially flush with the extremities 17 and 18, respectively, of the front fender member, to protect the same against engagement with objects coming into contact with the bowed or arcuate portion 23.

The bolts 14 are provided with flatly rounded heads 28 and with squared shank portions 29 adapted to be fitted into similarly squared portions of the apertures 13 to hold said bolts against rotation. Lock washers 30 and nuts 31 are provided for the threaded ends of the bolts projecting beyond the legs 24 and 25 through which said bolts extend. The spacing of the apertures 13 in the front fender member 12 is such that the bolts 14 do not pass through the bumper 10 but clear the top and bottom edges of said bumper by a slight distance. The fender member 12 and rear member 22 are thus clampingly held together on the bumper 10 with a portion of said bumper 10 secured between the legs 24 and 25 and the conforming portion 19 of the front fender member. It will be noted that when the nuts 31 are tightened up on the bolts 14, considerable clamping action can be developed due to the general concavity of the rear face of the fender member produced by the rearwardly sloping portions 20 and 21. Consequently, the extremities 17 and 18 of the front fender member are held tightly against the ends 26 and 27 of the rear member to lie substantially flush therewith and to afford no projection that might tend to engage with some foreign object.

The result is that if another bumper, such as that indicated in dotted lines in Fig. 3 by the reference numeral 33, should accidentally get behind the bumper 10 onto the bowed portion 23 of the guard 11, said bumper 33 would tend to ride up along the gradually sloping surface of said bowed portion 23 during movement tending to separate the bumpers 10 and 33 and the bumper 33 would be carried up clear of the extremity 17 upon continued relative movement of the two bumpers. In a similar way, if the bumper 10 were caused to ride up over a curb 34, indicated in dotted lines in Fig. 3, a reverse movement of the bumper relative to the curb would tend to cause the bowed portion 23 to lift the bumper 10 up over the curb to free the same therefrom.

As shown in Fig. 4, the rear portion 35 of the bumper guard 36 may be provided with plane sloping portions 37 and 38 extending to the extremities 39 and 40 of the front fender member 41. The camming action of the sloping portions 37 and 38 is similar to that of the circular arc-shaped portion of the bowed member 23 of the bumper guard 11 previously described.

As shown in Fig. 4, the bumper 42 may present curved front and rear faces and the front fender member 41 may be provided with a conforming surface portion 43. The legs 44 and 45 of the rear member 35 overlie and conform to portions of said bumper 42. Bolts 46, which may be fixedly secured in the rear face of the fender member 41 extend through said legs 44 and 45 clear of the bumper 42 and in conjunction with nuts 47 serve to hold said fender 41 and rear member 35 clamped upon the bumper 42.

In Fig. 5 the rear member 48 is parabolically curved to provide gradually sloping portions 49 and 50 extending to the extremities 51 and 52, respectively, of the front fender member 53. Said front fender member 53 is provided with an arcuate surface 54 conforming with the face of a curved bumper 55. The legs 56 and 57 of said rear member 48 overlie portions of the rear face of the bumper 55 and also conform therewith. Bolts 58 extend from the front fender member 53 through the legs 56 and 57 and nuts 59 are threaded on the bolt ends to hold the fender member 53 and the rear member 48 in clamping engagement upon the bumper 55.

It will thus be seen that all of the various forms of my invention provide rear bumper guard members that present gradually sloping surfaces toward the extremities of the front fender member to cause foreign objects, such as the bumper of another car, to ride thereover clear of the extremities of the front fenders during the movement tending to separate the same. This is an important feature of my invention, since it tends to facilitate the disengagement of bumpers that may become locked together upon two cars colliding with each other. Considerable trouble and unnecessary delay are thus avoided and the act of separation becomes almost an automatic one due to the camming action of the bumper guards of my invention.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. A bumper guard comprising a front fender member having tapered ends, a rear member having a rearwardly bowed portion and inturned ends, and means passing through said inturned ends for securing said members together with said tapered ends held tightly against said rear member and protected thereby against engagement from the rear thereof with foreign objects.

2. A bumper guard for mounting in vertical position on a bumper, comprising a front fender member having a concave rear face, a rear member having a rearwardly bowed portion and legs extending toward each other from the ends of said bowed portion to provide plane faces, and means extending from said fender member through said legs to clampingly secure said members together on a bumper with the bumper therebetween and clear of said securing means, the ends of said bowed portion being substantially flush with the ends of said fender member and said latter ends being held tightly against said plane faces.

3. A bumper guard for mounting in vertical position on a bumper, comprising a front fender member, a rear member having a rearwardly bowed portion and legs extending toward each other from the ends of said bowed portion, and means extending from said fender member through said legs to clampingly secure said members together on a bumper with the bumper therebetween and clear of said securing means, the ends of said bowed portion being substantially flush with the ends of said fender member and said latter ends being held tightly against said legs.

4. A bumper guard for mounting in vertical position on a bumper, comprising a front fender member, a rear member having a rearwardly parabolically bowed portion and legs extending toward each other from the ends of said bowed portion, and bolts extending from said fender member through said legs to clampingly secure said members together on a bumper with the bumper therebetween and clear of said bolts, the ends of said bowed portion being substantially flush with the ends of said fender member and said latter ends being held tightly against said legs.

5. A bumper guard comprising a front fender member having a convex front face and a rear face having a portion adapted to conform to the contour of the bumper, a rear member having legs adapted to overlie the rear face of said bumper and having a rearwardly bowed portion sloping gradually toward the ends of said front fender member to protect the same, and means for clampingly securing said members together upon the bumper with a portion of said bumper therebetween.

6. A bumper guard comprising a front fender member having a convex front face and a rear face having a portion adapted to conform to the contour of the bumper, a rear member having legs adapted to overlie the rear face of said bumper and having a rearwardly bowed portion sloping gradually toward the ends of said front fender member to protect the same, and means for clampingly securing said members together upon the bumper with a portion of said bumper therebetween, said securing means passing clear of said bumper portion.

7. A bumper guard for mounting in vertical position on a bumper, comprising front and rear members adapted to be clampingly secured on said bumper with the bumper therebetween, the upper and lower surfaces of said rear member converging rearwardly from the extremities of said front member at angles with the horizontal respectively less than forty-five degrees whereby to provide gradual inclines for the guiding outwardly past the front member extremities of objects contacting said incline rearwardly of the bumper.

8. A guard structure for the horizontal impact bar of an automobile bumper, said structure comprising front and rear members extending transversely of the impact bar and secured together to clamp the bar between them, the upper and lower surfaces of said rear member sloping rearwardly from the extremities of said front member to the horizontal planes of the upper and lower edges of said impact bar, said slope being sufficiently gradual to enable said surfaces to function as cams to gradually wedge out of interlock another automobile bumper bar interlocked with said bumper bar during relative horizontal movement of said bars toward each other.

9. A guard for the horizontal impact bars of automobile bumper structures, said guard comprising front and rear members extending transversely of the impact bar and clamped against the opposite sides thereof, the upper and lower surfaces of said rear member inclining rearwardly from the extremities of the front member with the angle of incline of the surfaces between the extremities of the front member and the horizontal plane of the upper and lower edges of the impact bar being less than forty-five degrees whereby to provide gradual inclines capable of functioning as cams to free interlocked bumper bars from each other as the cars on which the bumper bars are mounted pull away from each other.

10. A guard structure for the horizontal impact bars of automobile bumpers, said structure comprising front and rear members extending transversely of the impact bar and secured together to clamp the bar between them, said rear member being substantially wedge shaped with its upper and lower surfaces sufficiently gradually inclined to enable said member to function as a wedge to wedge apart interlocked bumpers as cars on which the bumpers are mounted are moved apart.

GEORGE A. TAFF.